United States Patent
Campbell

(10) Patent No.: US 8,944,303 B1
(45) Date of Patent: Feb. 3, 2015

(54) CLAMP-ON SADDLE BAG MOUNTING SYSTEM

(71) Applicant: Garry L. Campbell, Greenville, WI (US)

(72) Inventor: Garry L. Campbell, Greenville, WI (US)

( * ) Notice: Subject to any disclaimer, the term of this patent is extended or adjusted under 35 U.S.C. 154(b) by 235 days.

(21) Appl. No.: 13/763,881

(22) Filed: Feb. 11, 2013

Related U.S. Application Data

(60) Provisional application No. 61/602,443, filed on Feb. 23, 2012.

(51) Int. Cl.
*B62J 9/00* (2006.01)

(52) U.S. Cl.
USPC ............ 224/430; 224/431; 224/440; 224/429

(58) Field of Classification Search
USPC ......... 224/430, 447, 448, 431, 440, 429, 456, 224/461, 924
See application file for complete search history.

(56) References Cited

U.S. PATENT DOCUMENTS

| | | | | |
|---|---|---|---|---|
| 4,295,586 A * | 10/1981 | Shockley | ...................... | 224/430 |
| 4,449,653 A * | 5/1984 | Pirolli | ............................ | 224/426 |
| 4,577,786 A * | 3/1986 | Dowrick et al. | .............. | 224/448 |
| 4,934,572 A * | 6/1990 | Bowman et al. | ............... | 224/558 |
| 4,964,551 A * | 10/1990 | O'Donovan et al. | .......... | 224/415 |
| 4,974,759 A * | 12/1990 | McDonough | .................. | 224/443 |
| 5,226,341 A * | 7/1993 | Shores | ......................... | 74/551.8 |
| 5,238,160 A * | 8/1993 | Faulds | ............................ | 224/414 |
| 5,421,495 A * | 6/1995 | Bubik et al. | ................... | 224/310 |
| 5,667,117 A * | 9/1997 | Nutto | ............................. | 224/417 |
| 6,293,450 B1 | 9/2001 | Aron | | |
| 6,830,169 B1 | 12/2004 | Campbell | | |
| 8,074,851 B2 * | 12/2011 | Settelmayer et al. | ......... | 224/319 |
| 8,864,002 B2 * | 10/2014 | Iida et al. | ...................... | 224/413 |
| 2004/0069826 A1 * | 4/2004 | Neil | .............................. | 224/543 |
| 2008/0203126 A1 * | 8/2008 | Campbell | ...................... | 224/413 |
| 2009/0071992 A1 * | 3/2009 | Franz | ............................. | 224/420 |
| 2010/0108729 A1 * | 5/2010 | Golub et al. | .................. | 224/426 |

* cited by examiner

*Primary Examiner* — Brian D Nash
(74) *Attorney, Agent, or Firm* — Donald J. Ersler

(57) ABSTRACT

A clamp-on saddle bag mounting system preferably includes a base plate, a first pin plate, a second pin plate and a clamp unit. The base plate is secured to a saddle bag. The first pin plate is attached to a bottom of the base plate at a first end. The first pin plate is offset to receive a first end of the clamp unit. One end of the second pin plate is attached to a bottom of the base plate at a second end. The second pin plate is offset to receive a second end of the clamp unit. First and second mounting pins are inserted through the first and second pin plates. The clamp lever is pushed down to secure the saddle bag to a motorcycle. An offset mounting bracket is used to offset the position of a mounting pin on a mounting pin base of a motorcycle.

18 Claims, 7 Drawing Sheets

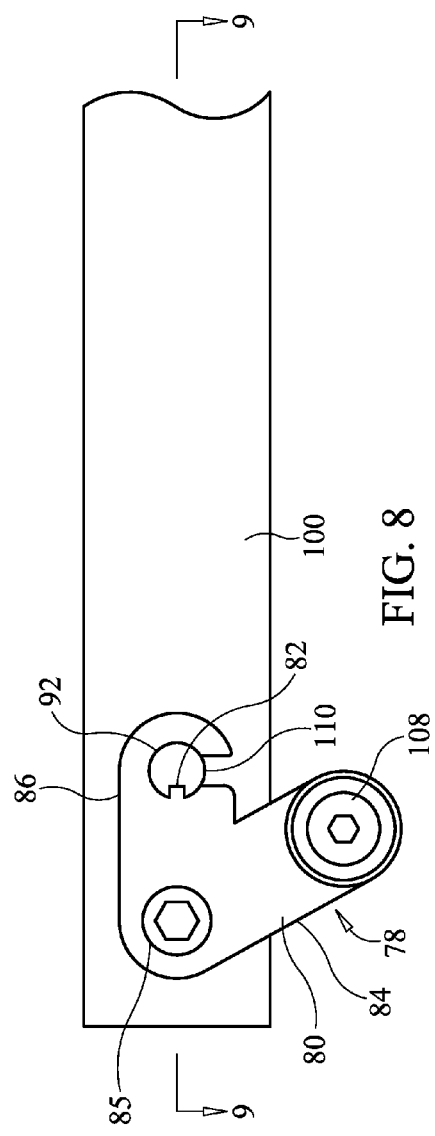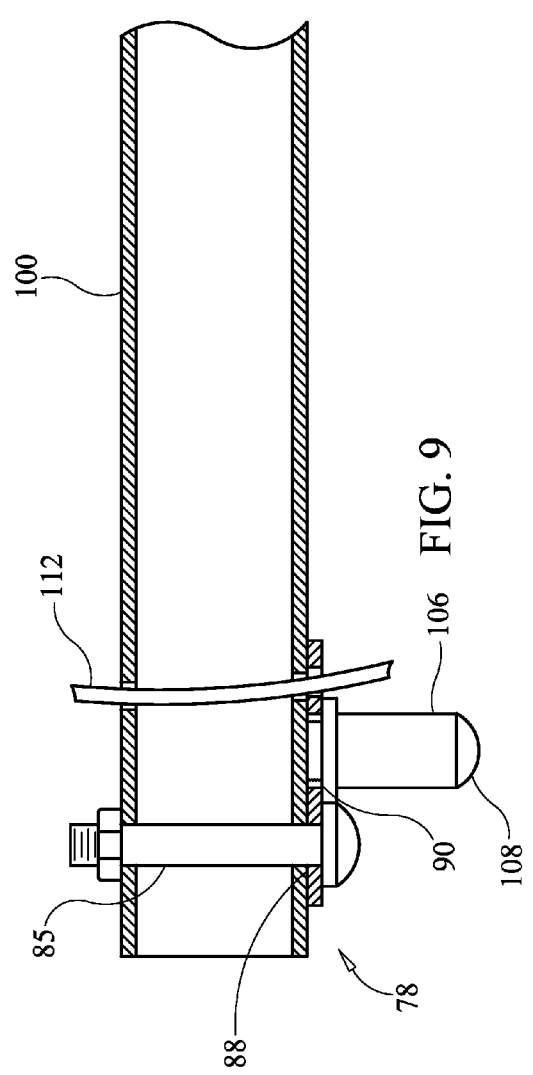

CLAMP-ON SADDLE BAG MOUNTING SYSTEM

CROSS-REFERENCES TO RELATED APPLICATIONS

This is a nonprovisional patent application taking priority from provisional application No. 61/602,443 filed on Feb. 23, 2012.

BACKGROUND OF THE INVENTION

1. Field of the Invention

The present invention relates generally to saddle bags for motorcycles and specifically to a clamp-on saddle bag mounting system, which enables a saddle bag to be tightly clamped to mounting pins on a motorcycle.

2. Discussion of the Prior Art

It appears that the prior art does not disclose a clamp-on saddle bag mounting system, which enables a saddle bag to be tightly and positively clamped to mounting pins on a motorcycle with a single level located outside the saddle bag. U.S. Pat. No. 6,293,450 to Aron discloses a quick release mechanism for motorcycle saddlebag. U.S. Pat. No. 6,830,169 to Campbell discloses a quick release saddlebag mounting system.

Accordingly, there is a clearly felt need in the art for a clamp-on saddle bag mounting system, which enables a saddle bag to be tightly and positively clamped to mounting pins on a motorcycle, and which includes an adjustable clamping force to compensate for stretching of the clamp-on bag mounting system, after a period of time.

SUMMARY OF THE INVENTION

The present invention provides a clamp-on saddle bag mounting system, which enables a saddle bag to be tightly clamped to mounting pins on a motorcycle. The clamp-on saddle bag mounting system (clamp-on mounting system) preferably includes a base plate, a first pin plate, a second pin plate and a clamp unit. The base plate is secured to a side wall of a saddle bag with rivets, fasteners or any other suitable attachment device. One end of the first pin plate is attached to substantially a bottom of the base plate at a first end thereof. The other end of the first pin plate is offset to receive a first end of the clamp unit. A first pin opening is formed through the other end of the first pin plate and the base plate to receive a first mounting pin of a motorcycle. The first pin opening may be a hole or a slot. One end of the second pin plate is attached to substantially a bottom of the base plate at substantially a second end thereof. The other end of the second pin plate is offset to receive a second end of the clamp unit. A second pin opening is formed through the other end of the second pin plate and the base plate to receive a second mounting pin of the motorcycle.

The clamp unit preferably includes a clamp lever, a first clamp yoke, a second clamp yoke and a turnbuckle. The clamp lever includes a base pivot arm and a clamp lever arm. The clamp lever arm preferably includes a lever pivot arm, a handle arm and a clamp handle. The lever pivot arm is attached to the base pivot arm. The lever pivot arm extends from an end of the handle arm and a clamp handle extends from a top of the handle arm. One end of the turnbuckle is pivotally retained between the lever pivot arm and the base pivot arm, adjacent the handle arm.

One end of the first clamp yoke is pivotally retained between the first pin plate and the base plate. The other end of the first clamp yoke is pivotally retained on an end of the lever pivot arm. One end of the second clamp yoke is pivotally retained between the second pin plate and the base plate. The other end of the second clamp yoke is pivotally retained on the other end of the turnbuckle. In use, the clamp lever is set to an unclamped position. First and second mounting pins of a motorcycle are aligned with the first and second pin openings. The first and second mounting pins are then inserted into the first and second pin openings. The clamp lever is pushed into a locked position to secure the saddle bag to the motorcycle.

An offset mounting bracket may be used to offset a position of a mounting pin on a mounting pin base of a motorcycle. The offset mounting bracket includes a mounting plate and a bend over tab. The mounting plate preferably includes a first leg and a second leg. A fastener hole is formed through a junction of the first and second legs at one end thereof. A fastener is inserted through the fastener hole to secure the offset mounting bracket to the mounting pin base. A mounting pin is threadably secured to the other end of the first leg. A tab hole is formed through the other end of the second leg. The bend over tab extends from a perimeter of the tab hole. The bend over tab is bent into a wire hole of the mounting pin base to prevent rotation of the offset mounting bracket relative to the mounting pin base.

Accordingly, it is an object of the present invention to provide a clamp-on mounting system, which enables a saddle bag to be tightly and positively clamped to mounting pins on a motorcycle.

It is a further object of the present invention to provide a clamp-on mounting system, which provides adjustable clamping force to compensate for stretching of the clamp-on mounting system, after a period of time.

Finally, it is another object of the present invention to provide an offset mounting bracket for offsetting a position of a mounting pin of a clamp-on mounting system.

These and additional objects, advantages, features and benefits of the present invention will become apparent from the following specification.

BRIEF DESCRIPTION OF THE DRAWINGS

FIG. 8 is a front view of an offset mounting bracket attached to a mounting pin base of a clamp-on mounting system in accordance with the present invention.

FIG. 9 is a cross sectional view of an offset mounting bracket attached to a mounting pin base of a clamp-on mounting system in accordance with the present invention.

DETAILED DESCRIPTION OF THE PREFERRED EMBODIMENTS

Figure 1:
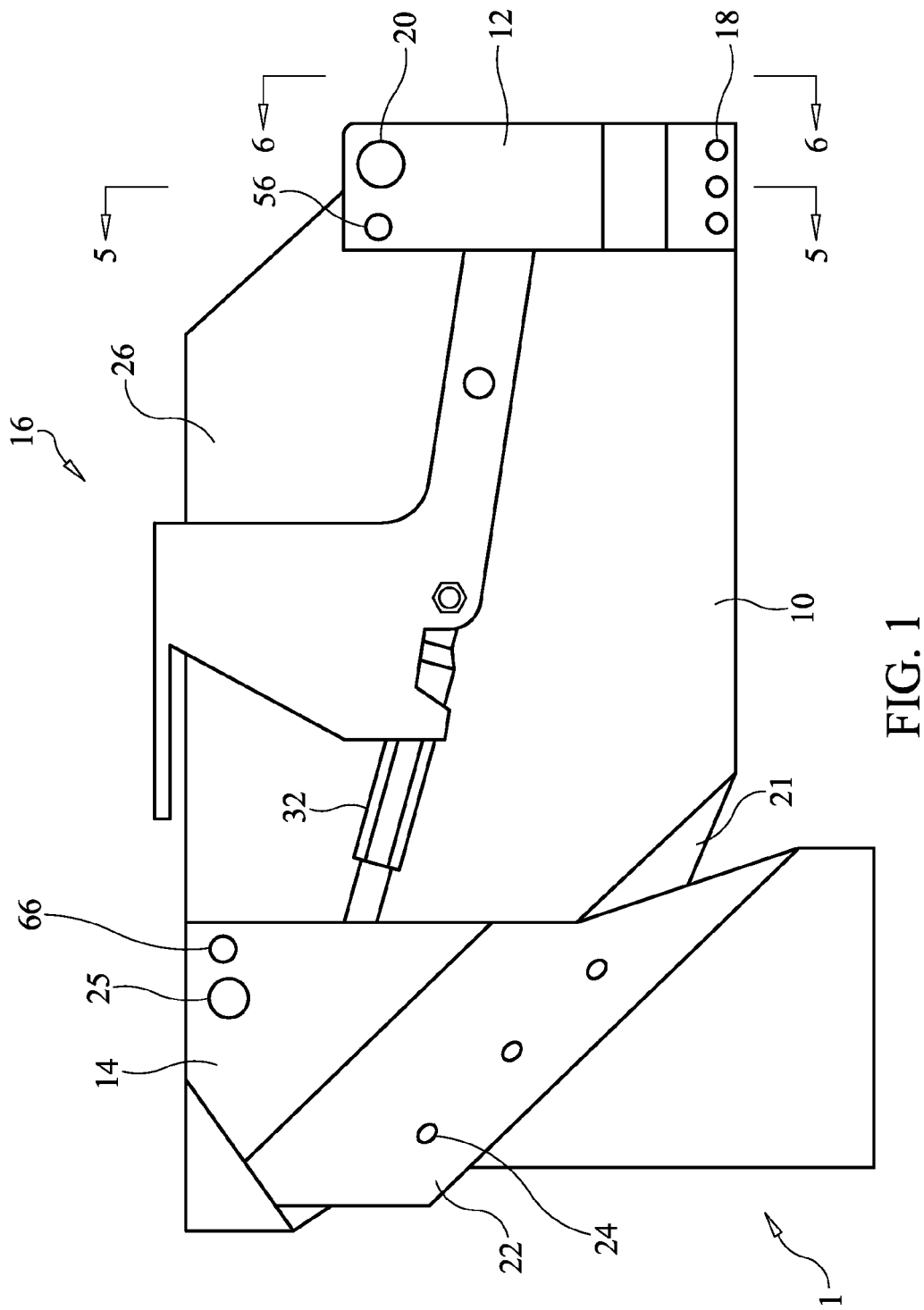
FIG. 1 is a front view of a clamp-on mounting system with a clamp lever in a locked position in accordance with the present invention.
Figure 2:
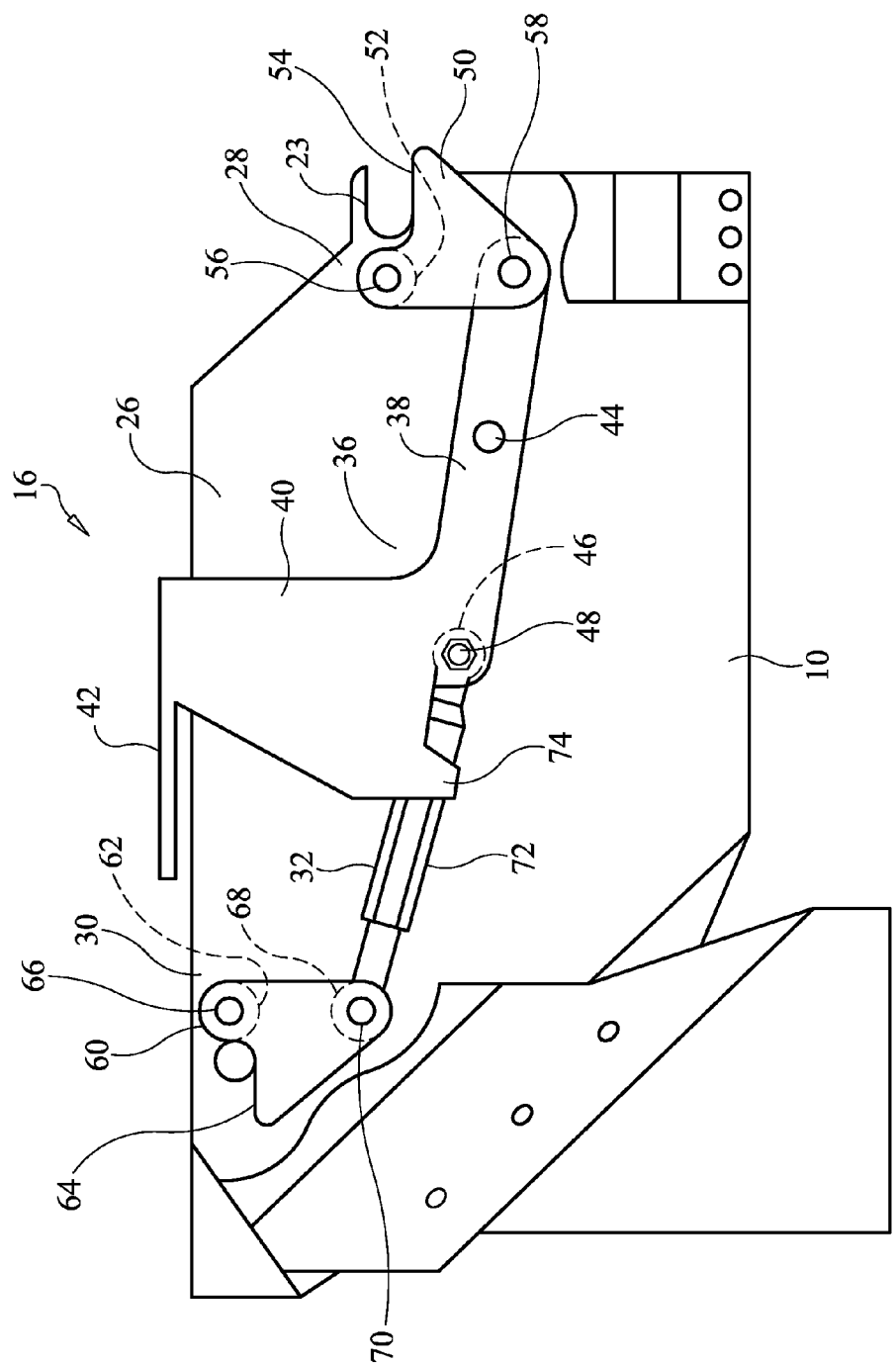
FIG. 2 is a front view of a clamp-on mounting system with a clamp lever in a locked position and with a portion of first and second pin plates removed to illustrate first and second clamp yokes in accordance with the present invention.

With reference now to the drawings, and particularly to FIG. 1, there is shown a front view of a clamp-on mounting system 1. With reference to FIG. 2, the clamp-on mounting system 1 preferably includes a base plate 10, a first pin plate 12, a second pin plate 14 and a clamp unit 16. The base plate 10 is secured to a side wall of a saddle bag (not shown) with rivets, fasteners or any other suitable attachment device. One end of the first pin plate 12 is preferably attached to substantially a bottom of the base plate 10 at a first end thereof with rivets 18 or the like.

Figure 5:
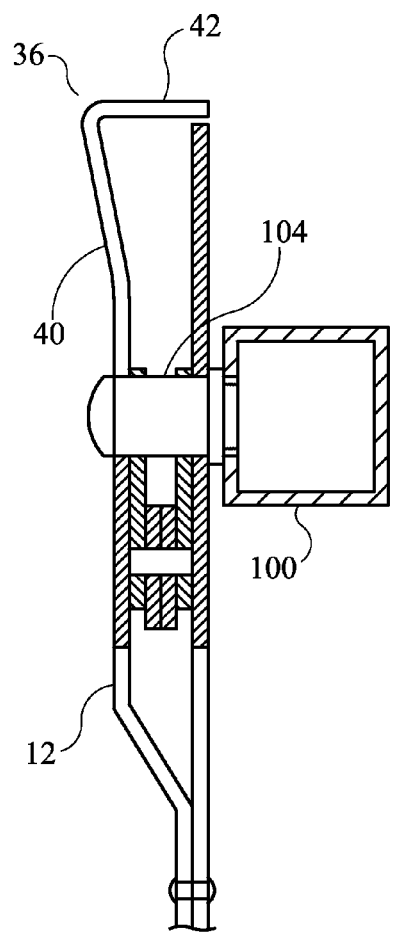
FIG. 5 is a partial cross sectional view of a clamp-on mounting system cut through a first clamping yoke in accordance with the present invention.
Figure 6:
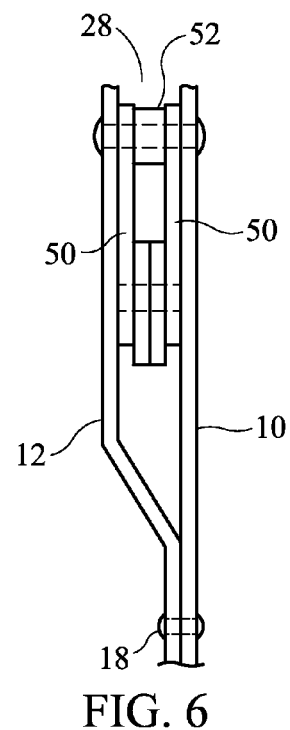
FIG. 6 is a partial end view of a clamp-on mounting system in accordance with the present invention.

With reference to FIGS. 5-6, the other end of the first pin plate 12 is offset to receive a first end of the clamp unit 16. With reference to FIGS. 8-9, a first pin opening 20 is formed through the other end of the first pin plate and the base plate 10 to receive a first mounting pin 104 extending from a mounting pin base 100 of a motorcycle. The first pin opening 20 may be a hole or a slot 23 as shown in FIG. 2. A bottom of the base plate 10 at a second end preferably includes a bent portion 21 to provide clearance for a portion of a motorcycle. One end of the second pin plate 14 is bent to form a bent leg 22. The bent leg 22 conforms to the bent portion 21. The bent leg 22 is preferably attached to the bent portion 21 with rivets 24 or the like. The other end of the second pin plate 14 is offset to receive a second end of the clamp unit 16. A second pin opening 25 is formed through the other end of the second pin plate 14 and the base plate 10 to receive a mounting pin 106 extending from the mounting pin base 100 of a motorcycle.

Figure 7:
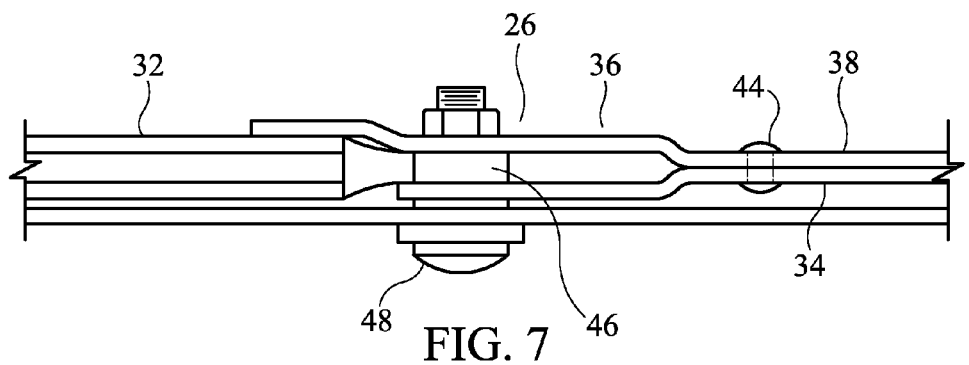
FIG. 7 is a partial bottom view of a clamp lever of a clamp-on mounting system in accordance with the present invention.

With reference to FIG. 7, the clamp unit 16 preferably includes a clamp lever 26, a first clamp yoke 28, a second clamp yoke 30 and a turnbuckle (linear adjustment device) 32. The clamp lever 26 includes a base pivot arm 34 and a clamp lever arm 36. The clamp lever arm 36 preferably includes a lever pivot arm 38, a handle arm 40 and a clamp handle 42. The lever pivot arm 38 is attached to the base pivot arm 34 with a rivet 44 or the like. The lever pivot arm 38 extends from an end of the handle arm 40 and the clamp handle 42 preferably extends perpendicularly from a top of the handle arm 40. A first loop end 46 of the turnbuckle 32 is pivotally retained between offset ends of the lever pivot arm 38 and the base pivot arm 34 with a fastener 48 or the like.

The first clamp yoke 28 preferably includes two first clamp plates 50 and a first spacer 52. Each first clamp plate 50 includes a first engagement surface 54 for retaining the first mounting pin 104. One end of the first clamp yoke 28 is pivotally retained between the first pin plate 12 and the base plate 10 with a rivet 56 or the like. The other end of the first clamp plates 50 are pivotally retained on an end of the base pivot arm 34 and the lever pivot arm 38 with a first pin 58 or the like. The second clamp yoke 30 preferably includes two second clamp plates 60 and a second spacer 62. Each second clamp plate 60 includes a second engagement surface 64 for retaining the second mounting pin 106. One end of the second clamp yoke 30 is pivotally retained between the second pin plate 14 and the base plate 10 with a rivet 66 or the like. The other end of the second clamp plates 60 are pivotally retained on a second loop end 68 of the turnbuckle 32 with a second pin 70.

Figure 3:
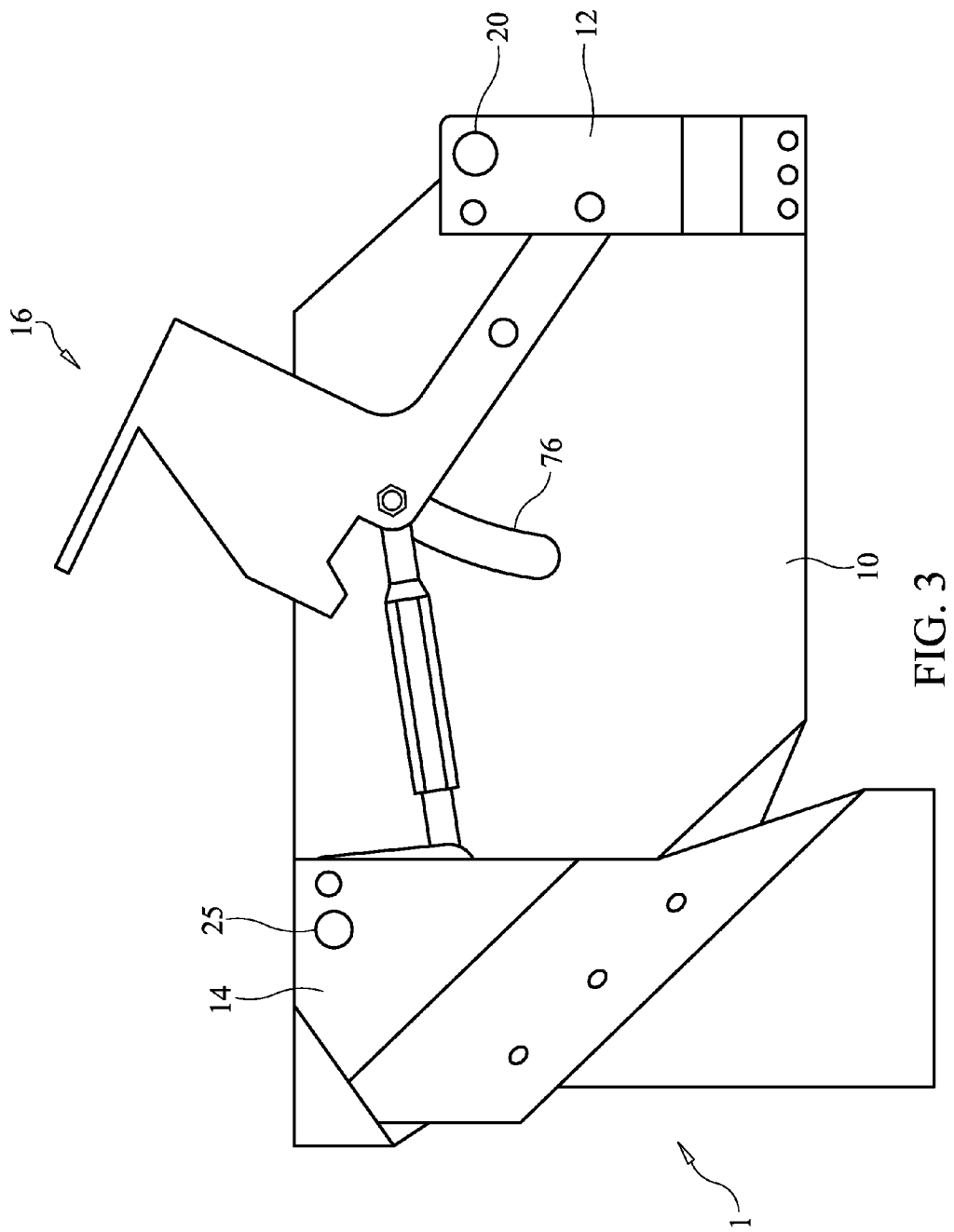
FIG. 3 is a front view of a clamp-on mounting system with a clamp lever in a unlocked position in accordance with the present invention.
Figure 4:
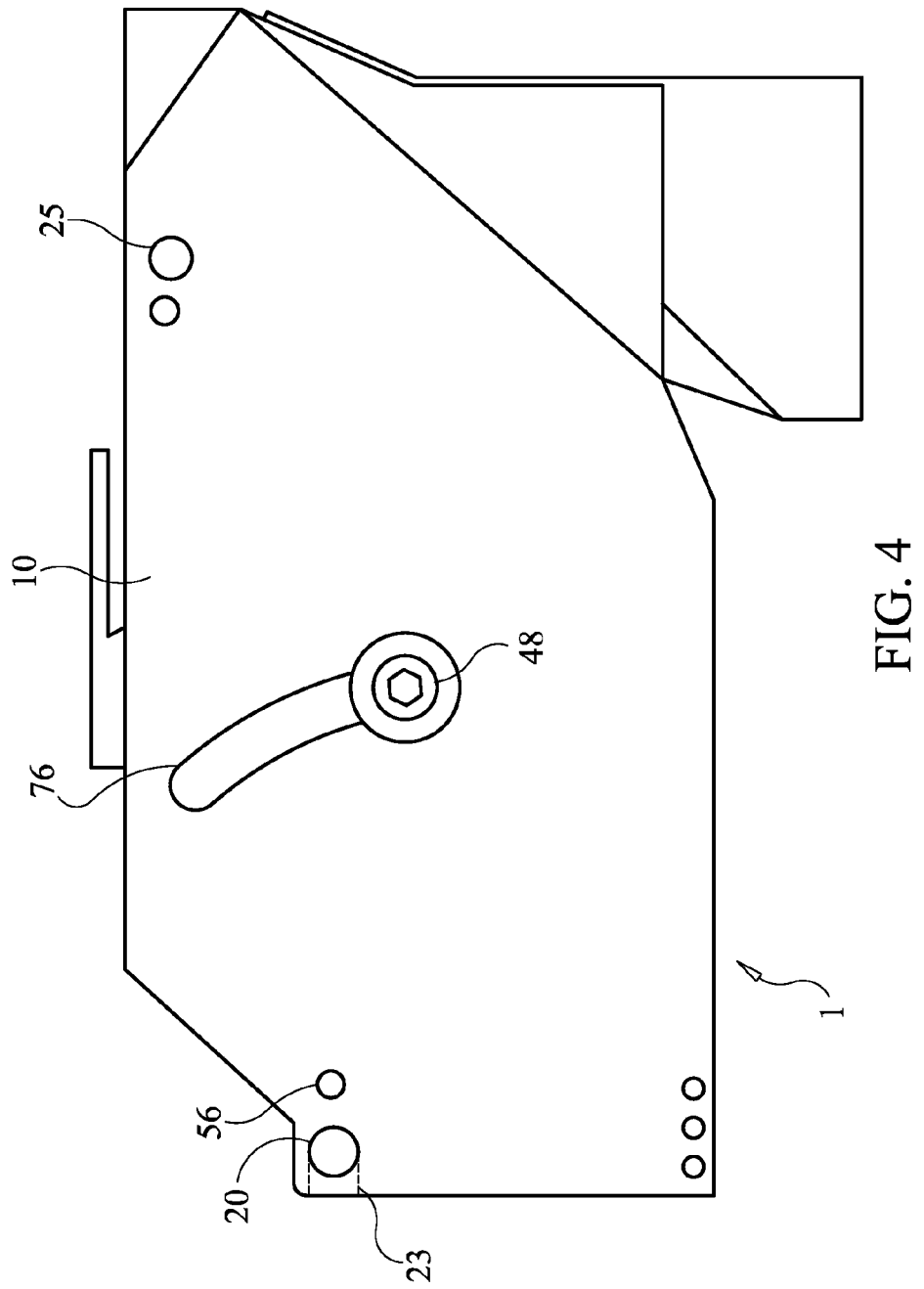
FIG. 4 is a rear view of a clamp-on mounting system with a clamp lever in a locked position in accordance with the present invention.

Rotation of a turnbuckle body 72 increases or decreases the pressure applied to the first and second mounting pins by the first and second engagement surfaces. An anti-rotation tab 74 prevents the turnbuckle body 72 from rotating relative to the base plate 10. Loosening fastener 48 allows the turnbuckle body to be rotated. With reference to FIGS. 3-4, a release movement of the clamp unit 16 is limited by a release slot 76. The fastener 48 also prevents the clamp unit 16 from flexing or distorting, when the first and second engagement surfaces lock on to the first and second mounting pins.

In use, the clamp lever 26 is set to an unclamped position. The first and second mounting pins 104, 106 retained on the mounting pin base 100 of a motorcycle are aligned with the first and second pin openings 20, 25. The first and second mounting pins are then inserted into the first and second pin openings. The clamp lever 26 is pushed into a locked position to secure the saddle bag (not shown) to the motorcycle (not shown). The clamp-on mounting system 1 is retained on the first and second pins 104, 106, because the handle arm 40 is locked over its center point, similar to the way a lever of a vise grips clamps an object placed in the jaws thereof.

Figure 10:
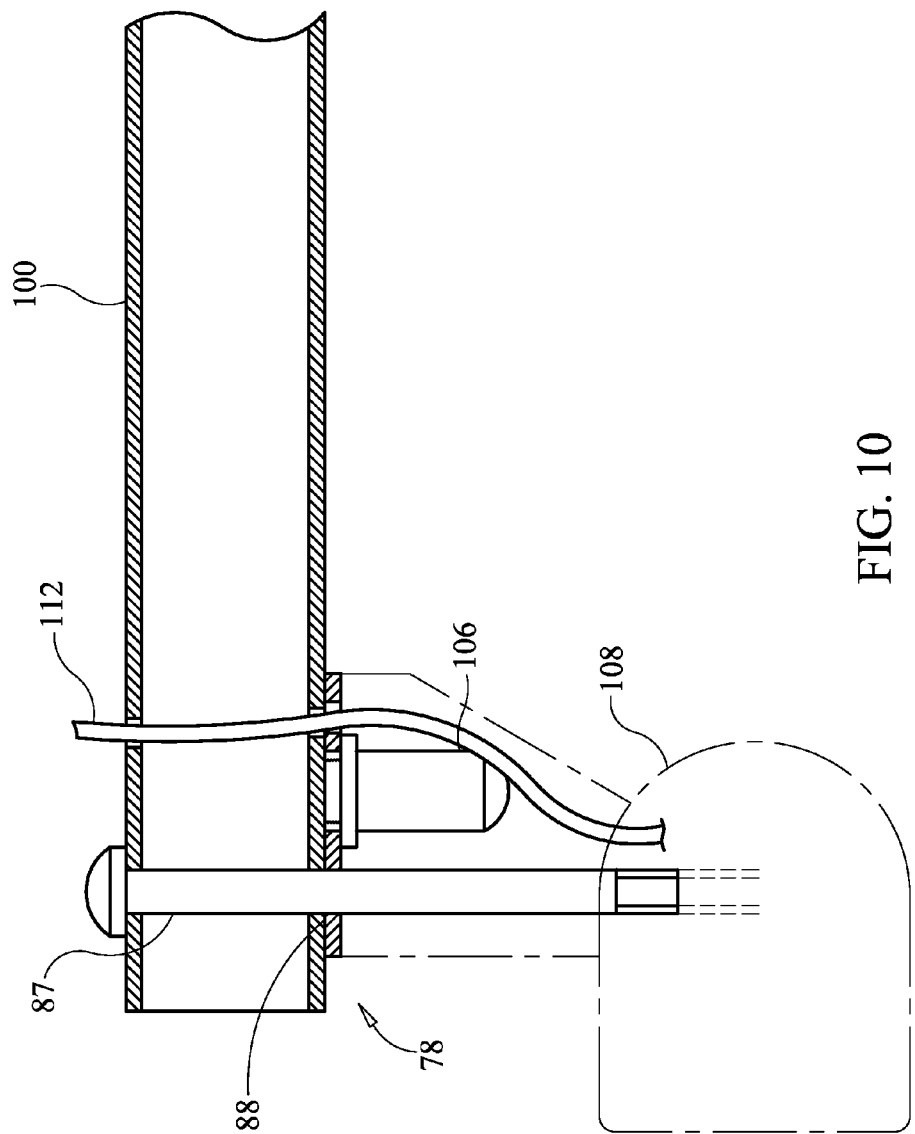
FIG. 10 is a cross sectional view of an offset mounting bracket secured to a mounting pin base of a clamp-on mounting system with a turn signal in accordance with the present invention.

With reference to FIGS. 8-9, an offset mounting bracket may be used to offset the position of a mounting pin on a motorcycle. The offset mounting bracket 78 preferably includes a mounting plate 80 and a bend over tab 82. The mounting plate 80 includes a first leg 84 and a second leg 86. A fastener hole 88 is formed through a junction of the first and second legs at one end thereof. A fastener 85 is used to fastener the offset bracket 78 to the mounting pin base 100. However, with reference to FIG. 10, the offset mounting bracket 78 may be secured against the mounting pin base 100 by retaining the offset mounting bracket 78 between a turn signal housing 108 and the mounting pin base 100. A fastener 87 is inserted through the mounting pin base 100 and the offset mounting bracket 78 and threaded into a threaded tap in the turn signal housing 108.

A threaded pin tap 90 is formed through the other end of the first leg 84 to threadably receive a fastener 108 of the second mounting pin 106. A tab hole 92 is formed through the other end of the second leg 86. The bend over tab 82 extends from a perimeter of the tab hole 92. The bend over tab 82 is bent into a wire hole 110 of the mounting pin base 100 to prevent rotation of the offset mounting bracket 78 relative to the mounting pin base 100. The wire hole 110 allows the insertion of at least one wire 112

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A clamp-on saddle bag mounting system comprising:
a base plate having a first pin opening and a second pin opening, said first pin opening is formed in a first end of said base plate, said second pin opening is formed in a second end of said base plate; and
a clamp unit includes a clamp lever, a first clamp device and a second clamp device, said first clamp device is pivotally engaged with said first end of said base plate, said second clamp device is pivotally retained in said second end of said base plate, a first end of said clamp lever is pivotally engaged with said first clamp device, a second end of said clamp lever is engaged with said second clamp device, said clamp lever is slidably engaged with said base plate.

2. The clamp-on saddle bag mounting system of claim 1, further comprising:
a linear adjustment device having a first end and a second end, said first end of said linear adjustment device is pivotally engaged with said clamp lever, said second end of said linear adjustment device is pivotally engaged with one of said first clamp device and said second clamp device.

3. The clamp-on saddle bag mounting system of claim 2 wherein:
an anti-rotation tab extends from said clamp lever, said anti-rotation tab prevents said linear adjustment device from rotating.

4. The clamp-on saddle bag mounting system of claim 2 wherein:
said clamp lever includes a base pivot arm and a clamp lever arm, said base pivot arm is attached to said clamp lever arm, said clamp lever arm includes a lever pivot arm, a handle arm and a clamp handle, said lever pivot arm extends from an end of said handle arm and said clamp handle extends perpendicularly from a top of said handle arm.

5. The clamp-on saddle bag mounting system of claim 1, further comprising:
a first pin plate is attached to said first end of said base plate, said first pin plate pivotally retains said first clamp device; and
a second pin plate is attached to substantially said second end of said base plate, said second pin plate pivotally retains said second clamp device.

6. The clamp-on saddle bag mounting system of claim 1, further comprising:
a mounting plate includes a first leg and a second leg, a fastener hole is formed through a junction of said first and second legs at one end thereof, a threaded pin tap is formed through the other end of said first leg, a tab hole is formed through the other end of said second leg; and
a bend over tab extends from a perimeter of said tab hole, wherein a fastener is inserted through said fastener hole to mount said mounting bracket to a mounting pin base of a motorcycle, a mounting pin is secured to said threaded pin tap with a second fastener, said bend over tab is located in a wire hole of the mounting pin base.

7. A clamp-on saddle bag mounting system comprising:
a base plate having a first pin opening and a second pin opening, said first pin opening is formed in a first end of said base plate, said second pin opening is formed in a second end of said base plate; and
a clamp unit includes a clamp lever, a first clamp device and a second clamp device, said first clamp device is pivotally engaged with said first end of said base plate, said second clamp device is pivotally retained in said second end of said base plate, a first end of said clamp lever is pivotally engaged with said first clamp device, a second end of said clamp lever is engaged with said second clamp device, wherein first and second mounting pins are inserted through said first and second pin openings, said first clamp device exerts pressure on the first mounting pin and said second clamp device exerts pressure on the second mounting pin, when said clamp lever is actuated.

8. The clamp-on saddle bag mounting system of claim 7, further comprising:
a linear adjustment device having a first end and a second end, said first end of said linear adjustment device is pivotally engaged with said clamp lever, said second end of said linear adjustment device is pivotally engaged with one of said first clamp device and said second clamp device.

9. The clamp-on saddle bag mounting system of claim 8 wherein:
an anti-rotation tab extends from said clamp lever, said anti-rotation tab prevents said linear adjustment device from rotating.

10. The clamp-on saddle bag mounting system of claim 8 wherein:
said clamp lever includes a base pivot arm and a clamp lever arm, said base pivot arm is attached to said clamp lever arm, said clamp lever arm includes a lever pivot arm, a handle arm and a clamp handle, said lever pivot arm extends from an end of said handle arm and said clamp handle extends perpendicularly from a top of said handle arm.

11. The clamp-on saddle bag mounting system of claim 7, further comprising:
a first pin plate is attached to said first end of said base plate, said first pin plate pivotally retains said first clamp device; and
a second pin plate is attached to substantially said second end of said base plate, said second pin plate pivotally retains said second clamp device.

12. The clamp-on saddle bag mounting system of claim 9, further comprising:
said first clamp device includes a first clamp plate disposed on each side of a first spacer, said second clamp device includes a second clamp plate disposed on each side of a second spacer.

13. The clamp-on saddle bag mounting system of claim 7 wherein:
said clamp lever is slidably engaged with said base plate.

14. A clamp-on saddle bag mounting system comprising:
a base plate having a first pin opening and a second pin opening, said first pin opening is formed in a first end of said base plate, said second pin opening is formed in a second end of said base plate; and
a clamp unit includes a clamp lever, a first clamp device and a second clamp device, said first clamp device includes a first clamp plate disposed on each side of a first spacer, said second clamp device includes a second clamp plate disposed on each side of a second spacer, said first clamp device is pivotally engaged with said first end of said base plate, said second clamp device is pivotally retained in said second end of said base plate, a first end of said clamp lever is pivotally engaged with said first clamp device, a second end of said clamp lever is engaged with said second clamp device.

15. The clamp-on saddle bag mounting system of claim 14, further comprising:
a linear adjustment device having a first end and a second end, said first end of said linear adjustment device is pivotally engaged with said clamp lever, said second end of said linear adjustment device is pivotally engaged with one of said first clamp device and said second clamp device.

16. The clamp-on saddle bag mounting system of claim 15 wherein:
an anti-rotation tab extends from said clamp lever, said anti-rotation tab prevents said linear adjustment device from rotating.

17. The clamp-on saddle bag mounting system of claim 15 wherein:
- said clamp lever includes a base pivot arm and a clamp lever arm, said base pivot arm is attached to said clamp lever arm, said clamp lever arm includes a lever pivot arm, a handle arm and a clamp handle, said lever pivot arm extends from an end of said handle arm and said clamp handle extends perpendicularly from a top of said handle arm.

18. The clamp-on saddle bag mounting system of claim 14, further comprising:
- a first pin plate is attached to said first end of said base plate, said first pin plate pivotally retains said first clamp device; and
- a second pin plate is attached to substantially said second end of said base plate, said second pin plate pivotally retains said second clamp device.

\* \* \* \* \*